United States Patent [19]

Priest et al.

[11] Patent Number: 5,814,693

[45] Date of Patent: Sep. 29, 1998

[54] COATINGS FOR CONCRETE CONTAINMENT STRUCTURES

[75] Inventors: Thomas G. Priest; Richard P. Chmiel; Richard L. Iazzetti, all of Houston, Tex.; Edward G. Brugel, Wilmington, Del.

[73] Assignee: Forty Ten, L.L.C., Houston, Tex.

[21] Appl. No.: 595,131

[22] Filed: Feb. 1, 1996

[51] Int. Cl.$^6$ .............................. C08K 5/54; C08K 3/34
[52] U.S. Cl. ..................... 524/188; 524/399; 524/424; 524/447; 524/492; 524/567; 428/447
[58] Field of Search ................... 524/188, 399, 524/424, 447, 492, 567; 428/447

[56] References Cited

U.S. PATENT DOCUMENTS

| | | | |
|---|---|---|---|
| 2,615,000 | 10/1952 | Bradley | 260/31.2 |
| 2,852,497 | 9/1958 | Thompson | 260/79.3 |
| 3,366,612 | 1/1968 | Baldwin | 260/85.3 |
| 3,398,045 | 8/1968 | Clayton et al. | 161/208 |
| 3,408,420 | 10/1968 | Wiggill | 260/827 |
| 3,441,545 | 4/1969 | Blatz et al. | 260/78.5 |
| 3,646,155 | 2/1972 | Scott et al. | 260/827 |
| 4,291,136 | 9/1981 | Keogh | 525/102 |
| 4,316,969 | 2/1982 | Koyama et al. | 525/145 |
| 4,328,323 | 5/1982 | Keogh | 525/106 |
| 4,343,917 | 8/1982 | Keogh | 525/106 |
| 4,493,924 | 1/1985 | Rifi | 525/102 |
| 4,513,060 | 4/1985 | Vasta | 428/416 |
| 4,515,917 | 5/1985 | Yamamoto et al. | 524/178 |
| 4,572,870 | 2/1986 | Vasta | 428/416 |
| 4,578,286 | 3/1986 | Vasta | 427/327 |
| 4,753,971 | 6/1988 | Davis, Jr. et al. | 524/109 |
| 4,959,414 | 9/1990 | Nakagawa et al. | 525/11 |
| 5,208,290 | 5/1993 | Brugel | 525/113 |
| 5,486,573 | 1/1996 | Hamajima | 525/274 |
| 5,486,590 | 1/1996 | Cabasso et al. | 528/23 |
| 5,489,662 | 2/1996 | Wakamatsu et al. | 528/14 |

FOREIGN PATENT DOCUMENTS

| | | |
|---|---|---|
| 1954761 | of 1969 | Germany . |
| 61-83216 | of 1986 | Japan . |
| 952111 | of 1960 | United Kingdom . |

OTHER PUBLICATIONS

U.S. Re 35,210 Official Gazette Notice for U.S. Patent 5,036,029 30 Jul. 91.

*Primary Examiner*—Kriellion S. Morgan
*Attorney, Agent, or Firm*—Browning Bushman

[57] ABSTRACT

A coating material for coating a substrate has been invented, the coating material including solvent, chlorosulfonated polyethylene dissolved in the solvent, hardener, and strengthener material. A process for producing a coating material for coating a substrate has been invented, the process including reacting chlorosulfonated polyethylene with an amino silane producing reaction product by the cross-linking of the chlorosulfonated polyethylene with the amino silane, adding carbon black to the reaction product, adding kaolin clay to the reaction product, and dissolving the reaction product, carbon black, and kaolin clay in a solvent forming a solution, the solution applyable to a substrate to form a coating thereon upon evaporation of the solvent.

29 Claims, No Drawings

COATINGS FOR CONCRETE CONTAINMENT STRUCTURES

BACKGROUND OF THE INVENTION

1. Field of the Invention

This invention is directed to polymeric coatings, methods of their application, and specific coating materials. In one aspect of a method according to this invention a chorosulfonated polyethylene material is sprayed on a subsrate with a hardener and an accelerator.

2. Description of Related Art

The prior art discloses a variety of polymeric coating materials and methods of their application to substrates. The prior art discloses a method for the moisture cure of chorosulfonated polyethylene. The prior art discloses a variety of coatings for sumps, trenches, tank interiors, containment linings, flooring systems and joint overlays. However, there has long been a need for a coating method that produces a coating that adheres sufficiently to a variety of substrates such as concrete, steel, existing polymer coatings, existing polymer linings, and existing polymer-based flooring. There has long been a need for such a coating method that produces a coating that is resistant to caustics, solvents and both organic and inorganic acids. There has long been a need for a coating method that produces a coating that has crack-briding properties so that the coating bridges both moving and stationary cracks in a substrate. There has long been a need for a coating method that produces a tough coating with good tear resistance and abrasion resistance. There has long been a need for a coating method that produces a coating with resistance to relatively high temperatures.

SUMMARY OF THE PRESENT INVENTION

The present invention, in certain embodiments, discloses a method for coating a substrate with a new polymeric chemically resistant coating material. Such a coating is useful on a wide variety of substrates, including, but not limited to, concrete, plastic, metal (e.g. steel) and on other coating materials including, but not limited to, previously applied coatings and linings. Such a coating may be applied to horizontal, vertical, curved, slanted or overhead substrates or surfaces.

In one aspect the polymeric coating material according to this invention includes a new moisture-cured cross-linked chlorosulfonated polyethylene ("CP") material formed by reacting the CP with an amino silane, e.g. with aminopropyl-trialkoxy silane, to effect chemical cross-linking of the CP with the amino silane. An amino group on the silane reacts with a sulonyl chloride group on the chlorosulfonated polyethylene, releasing moisture which acts as an accelerator to the coating. The substrate's temperature is, preferably, in a temperature range (substrate temperature) of about 50° F. to about 130° F. Useful amino silanes include, but are not limited to, 3-aminopropyl-triethhoxysilane. Carbon black powder (e.g., commercially available N762) and calcined kaolin clay and/or such clay treated with amino-silane (in one aspect the clay—commercially available Translink 555—is water fractionated pulverized powder, e.g. average size, largest dimension, 0.8 microns; +325 mesh residue, with free moisture preferably between 0.02% and 0.5% by weight is added) are added to increase strength and toughness.

In another aspect, CP is reacted with liquid amino silane in a chamber of a mill (e.g. a dual roller mill) along with amino-silane treated kaolin clay and-or carbon black powder (without solvent). The resulting material is introduced to an extruder which extrudes a tape which can be rolled up. This material is cured prior to rolling in a heating apparatus, e.g. an autoclave, at 230 degrees F. to 280 degrees F. (producing "Material 3," below). The tape is used as a joint overlay or crack repair material which is adhered to a substrate with an adhesive e.g. a two-part thermosetting adhesive. In one particular embodiment the tape is about five inches wide, about sixty mils thick at its center and tapers to a thickness of about twenty mils at both outer edges.

In one aspect of a method according to this invention the new chlorosulfonated polyethylene material in solid form (e.g. chips 1 inch×1 inch×100 mils thick in size) is solvated in a vessel by adding a solvent (including but not limited to acetone, xylene, methyl isobutyl ketone, diacetone alcohol, isopropyl alcohol, methyl isopropyl ketone, methyl normal butyl ketone, isobutyl ketone, normal butyl acetate, di-isobutyl ketone, and di-pentene, or mixture of two or more of these). Thixotropes may be added to adjust the material's ability to adhere to a surface, e.g. a vertical surface. An accelerator, e.g. dibutyltin (Bu2Sn) dilaurate, is then mixed into the solution. A liquid solution is produced that, after mixing with a hardener and an accelerator, is sprayed onto a substrate. In one aspect, conventional commercially available airless spray equipment is used; e.g. a Grayco Co. system with a 45:1 or 75:1 airless pump.

The solvent or solvents used allow workability and application of the material affect the curing of the finished coating. They inhibit the reaction of amino silane groups (in the hardener) with sulfonyl chloride groups on the chlorosulfonated polyethylene. As the initial release of solvents by evaporation commences, the reaction is initiated. As the solvents leave the material through evaporation, the reaction is facilitated. One solvent (e.g. a solvent of higher concentration than other solvents) acts as a last or "tail" solvent which evaporates last so that a homogeneous film or layer of desired thickness with consistent properties is achieved.

In one aspect of a method according to the present invention a substrate or surface to be coated is cleaned and, in certain preferred embodiments, e.g. with a steel substrate, the surface is abrasively blasted to "near white metal" (see, e.g. standards in SSPC-SP-10 or NACE 2). Then the CP—solvent solution, hardener, and accelerator are fed to a sprayer and sprayed onto the substrate.

Preferably the substrate temperature (e.g. concrete surface or steel surface) is measured. Coating is done preferably if the surface temperature is in the 50° F.–110° F. range. (Preferably air temperature is not used as an indication of substrate surface temperature.) It is preferable not to attempt coating if conditions are within 5° F. of dew point. Preferably, coating is accomplished in late afternoon or early evening when temperatures are falling and, for concrete substrates, when concrete is not expelling air. Concrete air expulsion may be reduced or eliminated by first applying a coating of fast cure epoxy to the concrete, preferably late in the day or early in the evening. Fast cure polyurea coating which cures in 15 seconds to 3 minutes and preferably in less than 30 seconds, may be used as an underlayment for coatings according to this invention. Substrates are, in certain embodiments abraded to a two mil anchor pattern profile.

The coating material, in certain preferred aspects, is applied to a thickness of no less than 40 mils (wet) and preferably to a thickness of about 50 mils (wet) by roller, brush, notched squeegee, or spray equipment. Typically the desired thickness is achievable in one pass on a horizontal surface or by two or three passes on a vertical surface by spraying.

In one embodiment, milled polymer solids (for eventual mixing with solvent, etc. useful in methods according to this invention) are produced by introducing solid cholorosulfonated polyethylene (e.g. commercially available Dupont H-30 solid CP material) into a dual roller mill which is preferably at a temperature below 160° F. and most preferably below 140° F. Cool water is circulated through the mill to reduce heat built-up. The rollers turn toward each other to shear and masticate solids introduced between the rollers. A polymer strip is produced by the mill action. The other dry ingredients are added. The finished material is removed from the mill and reduced to particles or chips. In another method polymer is fed through a mixing throat into a mixing chamber of a Banbury mixer and a pneumatic ram is lowered to compress the polymer. Steel rotors in the mixing chamber masticate the polymer producing heat and forming a uniform heated mass. The ram is then raised and filler ingredients may then be added and the ram is again lowered to compress the batch to produce a uniform homogeneous mixture. Temperature of the material is monitored periodically so that it does not exceed 160° F. The batch may be visually checked to insure uniform color, smooth continuous texture, and an overall uniform appearance. In one aspect talc (1% to 3% by weight) is added to inhibit the sticking together of the milled polymer solids. Plastic sheeting may be placed between each layer of solids to keep them separated. A finished batch is cooled to room temperature before it is placed in a shipment container.

Products according to this invention include pieces and mats of a cured coating material according to this invention and a pan or container lined with such material.

The present invention disclosed, in certain embodiments: a coating material for coating a substrate, the coating material having solvent, chlorosulfonated polyethylene dissolved in the solvent, hardener, and strengthener material; such a coating material of wherein the chlorosulfonated polyethylene is solid prior to dissolution in the solvent and the solids have a largest dimension of one inch; such a coating material wherein the solvent is selected from the group consisting of acetone, xylene, methyl isobutyl ketone, diacetone alcohol, isopropyl alcohol, methyl isopropyl ketone, methyl normal butyl ketone, isobutyl ketone, normal butyl acetate, di-isobutyl ketone, and di-pentene; such a coating material wherein the solvent is a combination of xylene, methyl isobutyl ketone, and diacetone alcohol; such a coating material wherein the solvent is a combination of at least two solvents including a first solvent and a tail solvent, the tail solvent present in a greater concentration than the first solvent, the first solvent evaporating first from the coating material on the substrate and at least a portion of the tail solvent evaporating after the first solvent has evaporated; such a coating material wherein solvent is present in a weight percent of at least 50%; such a coating material wherein the hardener is at least in part an amino silane; such a coating material wherein the hardener is substantiallly all an amino silane; such a coating material wherein the amino silane is present in the coating material in a weight percent of at least 4%; such a coating material wherein the strengthener material is from the group consisting of carbon black, aramid fibers, thermoplastic material, and kaolin clay; such a coating material wherein the strengthener material is present in the coating material in a weight percent of at least 5%; such a coating material wherein the strengthener material includes aramid fibers and kaolin clay present in a weight percent of at least 10%; such a coating material wherein the kaolin clay is calcined; such a coating material wherein the kaolin clay is treated with an amino silane; such a coating material of further including thickener; such a coating material wherein the thickener is from the group consisting of pieces or particles of silica flour, silica microspheres, ceramic beads, ground rubber, Kaolin clay, fumed silica, and a promoter; such a coating material further including accelerator; such a coating material wherein the accelerator is dibutyltin dilaurate; such a coating material without solvent and which is cured and formed into a roll of dispensable tape; such a coating material which is cured in a heating apparatus at a temperature between 230° F. to 280° F.; such a coating material wherein the chlorosulfonated polyethylene is present in a weight percent ranging between 30% and 40%; such a coating material wherein the chlorosulfonated polyethylene is present in a weight percent ranging between 36% and 38%; such a coating material wherein the solvent is present in a weight percent ranging between 20% and 70%; such a coating material which is self-extinguishing and has a viscosity ranging between 2500 and 4000 centipoises, elongation of at least 100%, a tensile strength of at least 800 psi, thermal shock resistability up to a change of 150° F., and a Shore A hardness between 70 and 80; such a coating material wherein the coating material is moisture-curable on a substrate of between about 50° F. to about 130° F.; such a coating material which is in the form of a continuous monolithic film on the substrate; such a coating material which has the ability to bridge a crack in the substrate with a largest dimension up to one-eighth inch; and any such coating material with a chlorinated polyolefin present in the coating material in a weight percent of between about 5% to about 20% to effect elongation of the coating material; and any such coating material formed into a solid product or a container linined with such a coating. The present invention discloses, in certain embodiments, a process for producing a coating material for coating a substrate, the process including reacting chlorosulfonated polyethylene with an amino silane producing reaction product by the cross-linking of the chlorosulfonated polyethylene with the amino silane, adding carbon strengtheners to the reaction product, (e.g. but not limited to carbon black powder and kaolin clay), and dissolving the reaction product and strengtheners in a solvent forming a solution, the solution applyable to a substrate (preferably with an accelerator) to form a coating thereon upon evaporation of the solvent.

It is, therefore, an object of at least certain preferred embodiments of the present invention to provide:

New, useful, unique, efficient, nonobvious coating methods and polymeric coating materials useful in such methods;

Such a method in which solvents are sequentially released from coating materials so that a desired coating film is achieved.

Such a method and such coating material so that a strong, crack-bridging, temperature resistant coating is formed;

Such a method and such coating material so that a coating is produced which adheres well to a variety of substrates;

Such a coating material which may be made into a pre-formed tape or roll for joint overlays and crack repair;

Such a coating material with tensile strength up to 4000 psi and with up to 100% elongation or more;

Such a coating which is chemically resistant to caustics, many solvents, and both organic and inorganic acids;

Such a coating able to withstand a spill of several aqueous materials at a temperature up to 300° F. and with the ability to resist thermal shocks up to a 150° F. change;

Such a coating which is flexible, continuous and monilithic with no joints or seams and which is homogeneous with no dissimilar portions or layers and with properties that are consistent throughout;

Such a coating which is easily applied and quickly cured;

Such a coating useful as a containment lining and which can be effectively applied over expansion joints;

Such a coating which may be applied over existing linings or coatings without removing the existing lining or coating;

Such a coating which is minimally affected by weathering and ultraviolet light;

Such a coating useful up to 200° F. in many corrosive aqueous environments;

Such a coating which requires no first primer coat on a substrate and which is resistant to color fading over time; and Such a material made into solid products, e.g. mats, films, layers, and pieces of film and pans or containers lined with such material.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

A more particular description of certain embodiments of the invention briefly summarized above is given below and forms a part of this specification. These are certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

In one embodiment solids of a chorosulfonated polyethylene material ("CPM") according to the present invention have the following composition:

| Ingredient | Weight % |
| --- | --- |
| Chlorosulfonated Polyethylene | 31.20 |
| Carbon Black | 0.12 |
| Titanium Dioxide, White | 0.78 |
| Calcined Kaolin Clay | 5.00 |

Typically such solids have a largest dimension of one inch. Process oil, e.g. liquid sun oil, is applied to mill rollers so ppolymer does not stick to the rollers and as much as 0.31% by weight of this oil may enter the final product. An epoxy resin liquid (instead of process oil; e.g. Shell Epon 828) is used to lubricate the mill rolls and it also acts as a scavenger to neutralize hydrochloric acid (preferably all of it) from the reaction of chlorosulfonated polyethylene and amino silane. Thus a harmful corrosive material is eliminated from the reaction product and substrate bonding ability is enhanced.

The calcined clay and carbon black may be deleted if a less tough product is desired. The kaolin clay also acts as a thixotrope and kaolin clay treated with an amino silane provides some of the amino silane for treatment of the polymer. Ranges for each ingredient, weight % are:

| Chlorosulfonated Polyethylene | 10.0 to 60.0 |
| --- | --- |
| Carbon Black | 0.1 to 1.0 |
| $TiO_2$ | 0.5 to 2.0 |
| Clay | 1.0 to 20.0 |
| Oil or epoxy liquid | 0.1 to 3.0 |

One solvent blend useful in the production of the coating material described above is 36.40 weight percent xylene, 18.20 weight percent methyl isobutyl ketone, and 5.30 weight percent diacetone alcohol. The xylene and/or xylene and diacetone alcohol act as the "tail" solvent. In one embodiment about 37.4% by weight of the CPM material is mixed with about 59.9% by weight of the liquid solvent blend, along with 1.70% by weight of fumed silica, a thixotrope, treated with hydrophobic oil, and about 1.00% by weight of a promoter for a uniform film finish and foam removal such as methylalkyl polysiloxane copolymer, e.g. commercially available BYKA525 from Byk Chemie Co., to produce a liquid resin useful with hardeners and accelerators as described herein.

In one aspect liquid resin is prepared by pumping the solvent blend into a closed mixing vessel while slowly adding the solid CPM material, agitating the contents as they are mixed together until the solids are completely dissolved. The promoter and fumed silica are added during the mixing process.

In certain embodiments the weight percent of the CPM solids ranges between 30% to 40%, with 36% to 38% preferred, and the viscosity ranges between 2500 to 4000 centipoises. Viscosity may be adjusted by adding solvent, or a solvent mixture, or by adding ketones such as methyl ethyl ketone, methyl isobutyl ketone or acetone in a range by weight percent of 1.0% to 15.0%. The resulting liquid resin solution is preferably packaged in lined steel containers. Typically one gallon of the solution weighs about 8.3 lbs.

In other embodiments the CPM material described above is modified as follows ("Material 3", below):

| Ingredient | Weight % |
| --- | --- |
| Chlorosulfonated Polyethylene | 31.20 |
| Carbon Black Powder | 0.12 |

-continued

| Ingredient | Weight % |
|---|---|
| TiO$_2$, White | 0.78 |
| Treated Kaolin Clay | 5.00 |
| Process Oil or epoly resin liquid | 0.1% to 3.0% |
| Aramid Fibers | 2% to 5.0% |
| Thickener | 5% to 40.0% |
| Thermoplastics | 1% to 20.0% |

Thermoplastics include, but are not limited to, neoprene, PTFE, natural rubber and Kevlar™ material. "Thickeners" include silica flour, silica micro spheres, ground rubber, and microscopic ceramic beads.

One embodiment of the coating material capable of curing at 50° F. employs as solvents acetone, methyl ethyl ketone, heptane and/or hexane.

The amount of amino silane in a hardener used with the CPM material affects the cross-link density of the chlorosulfonated polyethylene, thereby affecting the elongation of the final product. The elongation is directly related to crack-bridging ability. In one example a product produced using 4% amino silane by weight has a 235% elongation and a product using 6% amino silane by weight has a 150% elongation. If the amount of amino silane is increased, the cross-linking density and elongation are reduced. A product made with 4% amino silane by weight and as described above may be applied to a vertical surface to a thickness of 50 mils (wet), yielding a 20 mils DFT (20 mil thick layer after drying; "DFT" is "dry film thickness). The application of two such coats yields a layer or film 40 mils thick DFT. Such a coating that is cured has a tensile strength of 1345 lbs-ft/in squared; a bond strength to steel of 1.142 psi; a bond strength to concrete greater than the tensile strength of concrete and which breaks 5000 psi concrete; a Shore A hardness of 70 to 80; and a tear strength of 225 lbs-f/in.

Elongation is also adjustable in the final product by using chlorowax, a chlorinated polyolefin. In certain aspects between about 5% to about 20% chlorowax by weight is used (to effect an increase in elongation ranging between 10% to 50% while the ratio of chlorosulfonated polyethylene to amino silane and dibutyltin dilaurate remains constant.

In one embodiment a moisture-cured cross-linked chlorosulfonated polyethylene material according to the present invention for applying to a substrate is prepared by introducing an amount of the CPM-solvent-blend liquid into a mixing vessel. Preferably this liquid is stirred (e.g. by a "jiffy mixer") for about two minutes. Then a hardener, a caross-linking/curing agent such as an amino alkoxy silane, (preferably a hardener which is, high in amino silane content and, most preferably between 50% to 100% amino silane), is poured into the vessel, preferably into a vortex created by mixing, and a chemical reaction between CPM-solvent and hardener occurs. The resulting mixture is stirred for another two to three minutes and the vessel sides are scraped to prevent build-up thereon. Once the two parts are thoroughly mixed, mixing is, preferably, continued for at least another two minutes. Then an accelerator (e.g. DBTDL) is added, preferably by pouring into the vortex created by stirring, then the mixture is again stirred for at least two minutes and the sides of the vessel are frequently scraped. Typical proportions for the three components (producing a coating referred to as "Material 1" below) are:

| | 1 Gallon Unit | 5 Gallon Unit | 30 Gallon Unit |
|---|---|---|---|
| CPM Material | 8 lbs. | 40 lbs. | 240 lbs. |
| Hardener | .14 lbs. | .7 lbs. | 4.1 lbs. |
| Accelerator | .1 lb. | .5 lbs. | 3.0 lbs. |

Certain coating materials according to this invention have these properties:

| Material | Tesile Strength (psi) | Elongation % | 50% Modulus (psi) |
|---|---|---|---|
| 1 | 500–2500 | 100–300 | 100–500 |
| 2 | 2000–4000 | 50–100 | 700–2000 |
| 3 | 2000–4000 | 50–100 | 700–2000 |

"50% Modulus" means is the load in psi required to stretch or elongate the material to an increase of 50% of its initial length. "Material 2" is "Material 1" with the amount of amino silane increased to at least 4% by weight. The resulting solution is applied on a substrate or surface, preferably with a high quality natural bristle brush, a phenolic core short nap roller, a flat blade or notched squeegee, or with spray system with an airless pump 45:1 ratio, 2000–2500 psi fluid pressure, 3 gal./min. delivery-at-tip at fluid viscosity with a 0.017" twist cleanable tip.

A coating of any desired thickness may be applied. For certain embodiments a coating of at least 40 mils (wet) is acceptable. For other embodiments a coating with a thickness of about 50 mils (wet) is acceptable. Cure time of a coating is dependent on thickness, air temperature, and substrate temperature. Exemplary substrate temperatures and complete cure time (time after which coating may be exposed to chemicals) is as follows:

| Substrate Temperature °F. | Cure Times - Days |
|---|---|
| 70 | 10 |
| 80 | 7 |
| 90 | 5 |

The coating material should be applied as soon as possible after it is prepared. "Pot life" is dependent on temperature (as is the time period after which another coating may be applied), as shown below:

| Temperature ° | Pot Life (Hours) | Recoat Time Minimum (Hours) | Recoat Time Maximum (Hours) |
|---|---|---|---|
| 70 | 24 | 8 | 30 |
| 80 | 20 | 4 | 28 |
| 90 | 14 | 2 | 24 |

Recoat time is affected by wet film thickness. The times given above are for a 50 mils (wet) thick film. Thinner films may be recoated more quickly. In certain aspects, successive topcoats may be applied within 24 hours. Coatings may be recoated as soon as the material is tack free and cured sufficiently to resist damage by handling or by walking on the surface. Recoating is preferably done within 30 hours after the coating has sufficient strength to support a person walking thereon without damage. Regarding pot life, it is preferred that no more material be prepared than can be applied in a 4 hour period.

In certain preferred embodiments, it is preferred that the separate ingredients (polymer material, hardener, and accelerator) be stored between 70° F. and 80° F. for 24 hours prior to use to enhance handling properties.

In many coating and lining applications, a continuous, integral, monolithic coating of consistent thickness is desired. Film thickness may be checked with a wet film thickness gauge. Film thickness on steel structures may be checked with a magnetic dry film thickness gauge. Coatings to be subjected to immersion service may be tested for discontinuities and pin holes with a high voltage DC holiday detector set at no more than 100 volts per mil of film thickness being tested. Coatings on concrete surfaces may be checked for continuity by spark testing. For such testing, a conductive primer is applied to the concrete surface prior to the application of the coating material.

A coating as described above is self-extinguishing and will not support combustion. Applied to a thickness of 40 mils (wet) such a monolithic continuous coating is flexible enough to bridge cracks up to ⅛" across. Increasing thickness results in increasing crack-bridging ability. Such a coating is resistant to the following chemicals: acids—80% Acrylic, Glacial Acetic, 50% Chromic, 37% Hydrochloric, 70% Hydrofluoric, 70% Nitric, 85% Phosphoric, 98% Sulfuric; alkalines—Plating Solutions, Pulp Liquors, 10% Ammonium Fluoride, 1% Saturated Ammonium Hydroxide, 15% Calcium Hypochlorite, 45% Potassium Hydroxide, 50% Sodium Hydroxide, 15% Solium Hypochlorite, Triethanolamine; and chemicals and solvents such as Alcohols, Animal and Mineral Oils, Fuels and Fuel Oils, 30% Hydrogen Peroxide, Lubricating Oils, Methyl Cellosolve, Methylene Chloride, Sour Crude Oil, and Tricholorethane.

Holes in a liner or coating according to the present invention may be repaired by removing all chemical residue from the area to be repaired and then wiping it with a ketone solvent or degreaser. The surface is then abraded with sand paper, e.g. 20 mesh, effecting a two mil anchor pattern profile and, preferably an area one inch out from the area to be repaired is abraded also. The area is again wiped with solvent and dusted. The solvent is allowed to dry for at least 10 minutes and then a thin coat of the CPM-solvent etc. material is applied over the area to be repaired (1 to 3 mils wet) using brush strokes in the same general direction. A "tie coat" (e.g. a bond promoter such as a silane-based organic polymer) is then applied using brush strokes at right angles to the direction of application of the initial coat. The tie coat is allowed to dry for about 15 minutes and then another thin coat (1 to 3 mils wet) of the CPM-solvent etc material is applied. A tie coat is then applied in the same direction as the application of the initial thin coat. This is then allowed to cure for about 4 hours. Following this cure, the CPM-solvent etc. material is applied as described above to a desired thickness.

The ability to use the material produced by processes according to this invention as a coating and the properties and performance characteristics of it as disclosed by the data presented here are all unexpected.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A material for producing a monolithic, chemically resistant, flexible and resilient containment coating upon a concrete substrate, said material comprising:

between 30–40 percent-by-weight chlorosulfonated polyethylene;

at least 4 percent-by-weight 3-aminopropyl-triethoxy silane;

dibutyltin dilaurate as an accelerator;

0.1 to 3.0 percent-by-weight epoxy resin as a scavenger to neutralize hydrochloric acid appearing as an adduct in the cross-linking of said chlorosulfonated polyethylene and said silane; and a carrier comprising at least two solvents including a first solvent and a tail solvent wherein said first solvent will evaporate from said material before at least a portion of said tail solvent will evaporate and wherein said tail solvent is present in a greater concentration than said first solvent, said carrier comprising 20–70 percent-by-weight of said material.

2. The material of claim 1 wherein said first solvent is methyl isobutyl ketone and said tail solvent is selected from the group consisting of xylene and a mixture of xylene and di-acetone alcohol.

3. The material of claim 2 wherein said material further comprises at least 5 percent-by-weight of a strengthener selected from the group consisting of carbon black, aramid fibers, thermoplastic material and kaolin clay.

4. The material of claim 3 wherein said material further comprises a thickener selected from the group consisting of silica flour, silica microspheres, fused silica, ceramic beads, ground rubber and kaolin clay.

5. A material for producing a monolithic, chemically resistant, flexible and resilient coating upon a substrate, said material comprising:

a chlorosulfonated polyethylene;

an amino trialkoxy silane;

an accelerator;

a sufficient quantity of a scavenger to neutralize hydrochloric acid appearing as an adduct in the cross-linking of said chlorosulfonated polyethylene and said silane; and a carrier comprising at least two solvents including a first solvent and a tail solvent wherein said first solvent will evaporate from said material before at least a portion of said tail solvent will evaporate and wherein said tail solvent is present in a greater concentration than said first solvent.

6. The material of claim 5 wherein said scavenger is an epoxy resin.

7. The material of claim 6 wherein said epoxy resin is present in an amount from 0.1 to 3.0 percent-by-weight of said material.

8. The material of claim 5 wherein said first and tail solvents are selected from the group consisting of acetone, xylene, methyl isobutyl ketone, diacetone alcohol, isopropyl alcohol, methyl isopropyl ketone, methyl normal butyl ketone, isobutyl ketone, normal butyl acetate, di-isobutyl ketone and di-pentene.

9. The material of claim 5 wherein said carrier comprises xylene, methyl isobutyl ketone and di-acetone alcohol.

10. The material of claim 5 wherein said carrier comprises acetone, methyl ethyl ketone and an alkane selected from the group consisting of hexane, heptane and mixtures thereof.

11. The material of claim 5 wherein said carrier comprises 20–70 percent-by-weight of said material.

12. The material of claim 11 wherein said carrier comprises at least 50 percent-by-weight of said material.

13. The material of claim 11 wherein said chlorosulfonated polyethylene comprises 30–40 percent-by-weight of said material.

14. The material of claim 13 further comprising a strengthener selected from the group consisting of carbon black, aramid fibers, thermoplastic material and kaolin clay.

15. The material of claim 14 further comprising a thickener selected from the group consisting of silica flour, silica microspheres, fused silica, ceramic beads, ground rubber and kaolin clay.

16. The material of claim 14 wherein said material further comprises 5–20 percent-by-weight of a chlorinated polyolefin to effect elongation of the cured coating material.

17. The material of claim 5 wherein said amino trialkoxy silane is 3-aminopropyl-tri-ethoxy silane and said accelerator is dibutyltin dilaurate.

18. A containment lining comprising a monolithic layer of a chemically resistant, flexible and resilient coating adhered and cured to a concrete substrate by applying to said substrate a layer of a material selected from the group consisting of the materials of claims 65–77 and curing said material by evaporating said carrier.

19. The lining of claim 18 wherein said material was applied to said substrate at a substrate temperature of between 50° F. and 110° F.

20. The lining of claim 19 wherein said coating material was cured to said substrate at a temperature between 50° F. and 130° F.

21. The lining of claim 18 wherein said material was applied to said substrate at a thickness of at least 40 mils when wet.

22. The lining of claim 21 wherein said cured coating can be elongated at least 100 percent.

23. The lining of claim 21 wherein said coating has a tensile strength of at least 800 psi, a thermal shock resistability up to a change of 150° F. and a Shore A hardness between 70 and 80.

24. A monolithic, chemically resistant, flexible and resilient coating comprising chlorosulphonated polyethylene cross-linked with an amino trialkoxy silane adhered and cured to a substrate by applying to said substrate a layer of a material selected from the group consisting of the materials of claims 61–64 and curing said material by evaporating said carrier.

25. The coating of claim 24 wherein said material was applied to said substrate at a substrate temperature of between 50° F. and 110° F.

26. The coating of claim 25 wherein said coating material was cured to said substrate at a temperature between 50° F. and 130° F.

27. The coating of claim 24 wherein said material was applied to said substrate at a thickness of at least 40 mils when wet.

28. The coating of claim 24 wherein said cured coating can be elongated at least 100 percent.

29. The coating of claim 27 wherein said coating has a tensile strength of at least 800 psi, a thermal shock resistability up to a change of 150° F. and a Shore A hardness between 70 and 80.

* * * * *

UNITED STATES PATENT AND TRADEMARK OFFICE
CERTIFICATE OF CORRECTION

PATENT NO. : 5,814,693

DATED : September 29, 1998

INVENTOR(S) : Thomas G. Priest; Richard P. Chmiel; Richard L. Iazzetti and Edward G. Brugel It is certified that error appears in the above-identified patent and that said Letters Patent is hereby corrected as shown below:

Column 11, line 30, delete "65-77" and replace with -- 5-17 --.
Column 12, line 17, delete "61-64" and replace with -- 1-4 --.
Column 12, line 27, delete "24" and replace with -- 27 --.

Signed and Sealed this

Eleventh Day of May, 1999

Attest:

Q. TODD DICKINSON

Attesting Officer

Acting Commissioner of Patents and Trademarks